United States Patent [19]
Steen et al.

[11] Patent Number: 4,704,030
[45] Date of Patent: Nov. 3, 1987

[54] ELECTROMAGNETIC RADIATION DETECTORS

[75] Inventors: William M. Steen, New Malden; Vijitha M. Weerasinghe, London, both of England

[73] Assignee: Quantum Laser Corporation, Edison, N.J.

[21] Appl. No.: 734,179

[22] Filed: May 15, 1985

[30] Foreign Application Priority Data

May 18, 1984 [GB] United Kingdom ............... 8412832

[51] Int. Cl.$^4$ .............................................. G01J 1/56
[52] U.S. Cl. ..................................... 356/121; 356/213
[58] Field of Search ............... 356/121, 213, 216, 217; 374/32; 73/863.38, 863.68, DIG. 4

[56] References Cited

U.S. PATENT DOCUMENTS

| | | | |
|---|---|---|---|
| 3,409,377 | 11/1968 | Rogallo | 356/217 |
| 3,487,685 | 1/1970 | Shifrin | 73/190 |
| 3,531,210 | 0/1970 | Shahrokhi et al. | 356/216 |
| 3,738,168 | 6/1973 | Mansell | 73/190 |
| 4,325,252 | 4/1982 | Miller et al. | 73/190 |
| 4,381,148 | 4/1983 | Ulrich et al. | 356/213 |

FOREIGN PATENT DOCUMENTS 0048820 3/1983 Japan .................................. 356/213
1127818 9/1968 United Kingdom .

OTHER PUBLICATIONS

*Lasers in Industry*, pp. 567–569, edited by S. S. Charschan, Member of Research Staff, Western Electric.
*Applied Optics*, vol. 10, No. 8, Aug. 1971, pp. 1959–1960, J. M. Davies and P. H. Peter, "Calorimeter with a Highly Reflecting Surface for Measuring Intense Thermal Radiation".

Primary Examiner—F. L. Evans
Attorney, Agent, or Firm—Shlesinger, Arkwright & Garvey

[57] ABSTRACT

A predetermined characteristic of a laser beam is detected by disposing a reflector (11) in the path of the beam and coupling an electromechanical transducer (12) to the reflector to detect a mechanical response of the reflector to the incident beam.

25 Claims, 4 Drawing Figures

ELECTROMAGNETIC RADIATION DETECTORS

This invention concerns the detection of electromagnetic radiation, particularly measurement of the total power or power distribution in a high powered laser beam.

The measurement of the total power in a high powered laser beam is usually done by stoppng the beam in a calorimeter as described, for example, in the article by Davies and Peter "Applied Optics" Vol. 10, No. 8, August 1971, pp 1959/60. Such measurements can only be made, however, when the beam is not being used, and this technique is therefore unsuitable for current production processes where the laser beam is "on" almost continuously.

In-process beam measurement can be made using either a beam splitter or a semi-transparent "back-end" mirror in the laser cavity, but both these methods take a measurable fraction of the laser power for their signal generation. One recent alternative is the use of a flying wire or chopper blade which intermittently reflects a small percentage of the beam to a detector. The resulting signal is usually in the form of a power profile, and it represents a measurable loss of power. Moreover, particularly with chopper blades, it also introduces a pulse into a continous power beam.

Other proposals have included the use of thermocouples for measuring the temperature field generated by the laser on a thin mirror (U.S. Pat. No. 3,738,168), the use of gas expansion tubes or chambers placed in the beam path (U.S. Pat. Nos. 4,325,252, 4,381,148 and 3,487,685), and the use of pyroelectric detectors (Charschan - Lasers in Industry pp 567–659).

None of these proposals has been entirely satisfactory. Devices, such as those described in U.S. Pat. No. 3,738,168, which rely upon measuring the heating effect of the laser beam on a mirror generally suffer from high thermal inertia so that the measurements represent the power integrated over a period of time dependent upon the bulk of the mirror. They may also suffer from blurred beam images due to the spread within the mirror body. If the devices are limited to thin mirrors then, as a rule, they are also limited to lower power densities. Devices which detect gas pressure generally require either pulsed lasers to generate pressure variations (U.S. Pat. No. 4,325,252), means for modulating the gas composition U.S. Pat. No. 4,381,148), or a closed gas chamber in which the pressure steadily rises (U.S. Pat. No. 3,487,685). The use of pyroelectric detectors requires a chopped signal to avoid heating of the ferrorelectric.

One final proposal, as described in UK Pat. No. 1,127,818, has been to use the charge effect induced in a piezoelectric crystal when illuminated by electromagnetic radiation. As with calorimeters, however, such devices block the beam and could not therefore be used for in process measurements. Moreover they could handle only relatively low power densities.

An object of the present invention, therefore, is to provide a more satisfactory and versatile device which overcomes at least some of these drawbacks but which at the same time is simple to manufacture and has a fast response time.

According to the present invention a method of detecting a predetermined characteristic of a beam of electromagnetic radiation comprises locating a reflector in the path of the beam and detecting a mechanical response of the reflector to the incident beam. Apparatus embodying the invention thus comprises a reflector for reflecting the beam of radiation and an electromechanical transducer responsive to the beam striking the reflector for providing an output signal dependent on the characteristic.

The transducer is preferably a pressure sensitive transducer for detecting continuous pressure and/or periodic vibrations induced in the reflector by the incident beam. The reflector may be part of the normal beam handling system.

The beam characteristic may, for example, comprise the power density, and we have found that this can be monitored by measuring the voltage level and/or the frequency of the output signal obtained from the transducer.

The performance of the reflector is not affected by the measurement, and the system is therefore especially suited for in-process measurements. The instrument measures the required beam characteristic, with no additional beam interruption, distortion or power loss other than that normally associated with reflecting mirrors.

The reflector responds almost instantaneously to the incident beam and the system therefore has a fast response time. Moreover it is capable of handling high power densities since the transducer itself does not interrogate the beam.

By way of example only, an embodiment of the invention will now be described with reference to the accompanying drawings in which:

FIG. 3 is a graphical representation of the signals obtained from the system shown in FIGS. 1 and 2.

Figure 2:
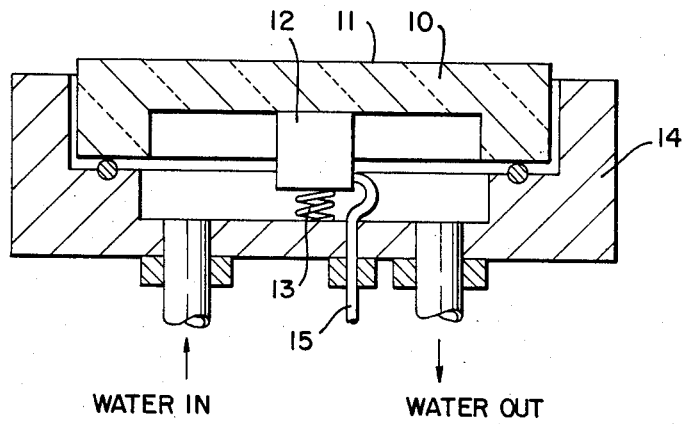
FIG. 2 is a diagrammatic section through the mirror/transducer assembly in the system of FIG. 1.

Referring first to FIG. 2, a totally reflecting mirror 10, consisting for example of a block of copper having a gold plated or polished reflecting surface 11, is fitted with a piezoelectric transducer 12. The transducer 12 is urged against the back of the mirror 10 by a spring 13 and acoustically coupled by means of, for example, vacuum grease.

The back of the mirror 10 is recessed to accommodate the transducer 12 and the whole assembly is mounted within a water-cooled mounting ring 14. The signal from the transducer is fed out on line 15.

Figure 1:
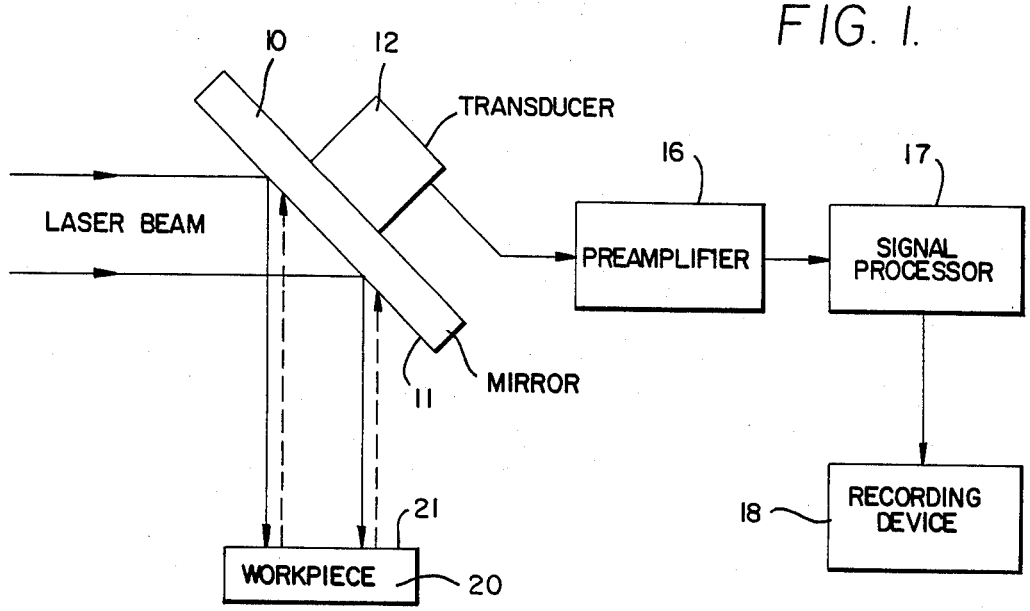
FIG. 1 is a diagrammatic representation of a system embodying the invention for monitoring the characteristics of a laser beam.

As shown schematically in FIG. 1, when a high powered laser beam (>100 W per sq. cm.) strikes the reflecting surface 11, a signal is detected by the transducer 12 and is fed to a preamplifier 16, a signal process 17 and a recording device 18.

The mirror 10 forms part of the normal beam handling system and may comprise a mirror within the laser cavity itself.

Figure 4:
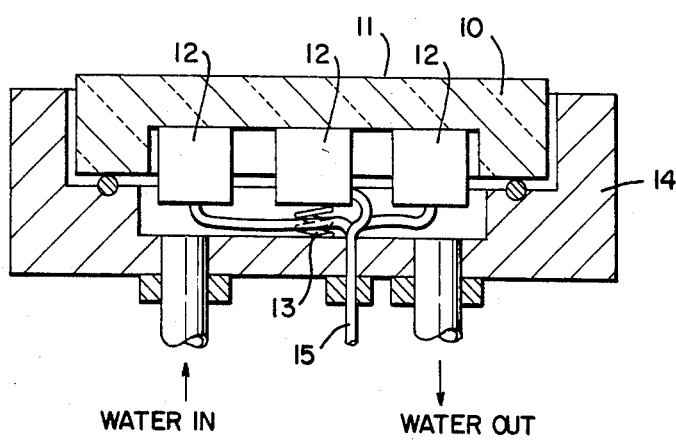
FIG. 4 is another embodiment, similar to that of FIG. 2, but including plural transducers.

The detected signal is shown in FIG. 3 as trace 'A'. It is a high frequency signal (the high frequency oscillations not being visible on the trace) with a fast response time and with a low frequency superimposed signal showing some systematic variation in beam characteristics. The high frequency signal is observed regardless of whether the transducer 12 is located against the rear of the mirror 10 or against the rear of the cooling ring 14. it is not therefore dependent on the heating effect of the laser beam but on mechanical stress waves induced in the mirror, and it is thought these may be due to a beat frequency within the laser beam. The beam is, in effect, knocking on the surface of the mirror and producing a 'ringing' effect. In some cases, the transducer might be coupled to the mirror by a component capable of transmitting the mechanical response of the mirror, the transmitting component comprising, for example, a waveguide or exponential horn. FIG. 3 shows the signal from the recording device 18 (trace 'A') compared with a signal obtained from a conventional calorimeter measurement (trace 'B'). FIG. 3 is a plot of amplitude against time, over a total period of 1 hr. 20 mins., (with a break between $t_2$ and $t_3$ during which the signal was not recorded) the laser HT being switched ON at $t_1$ and being switched OFF at $t_6$. Between $t_4$ and $t_5$ the beam was deflected from the mirror to determine the effect of cooling. No effect was found. Experiments have shown that the voltage level of the output signal is related to the power of the radiant energy falling on the mirror, either directly from the laser source or after back reflection from a workpiece, and the signal varies according to the size and position of the transducer relative to the beam. The device can therefore be used as a power density meter for monitoring the strength of a laser beam of known diameter over a period of time, or for measurements of the beam size and/or position, or as a back reflector monitor. A cluster of transducers 12 can be used instead of the single transducer 12 to assist measurement of the beam position, as best shown in FIG. 4.

The signal processor 17 may also, analyze the frequency of the detected signal to detect any frequency peaks in the frequency spectrum of the signal, the peaks being related to particular beam and laser cavity characteristics.

If the laser beam is focused, movement of the mirror 11 toward or away from the focal point varies the voltage level of the output signal, and this variation can be used to assist correct positioning of a workpiece 20 relative to the focal point.

The output signal also provides an indication of the quality of the reflecting surface and can therefore be used to monitor this quality over a period of time.

Since the output signal is particularly sensitive to the power density of the beam and to back reflections, the inclination of a workpiece surface 21 relative to a focused beam can be detected if the beam from the workpiece surface is reflected back to the mirror 11. In particular a non-perpendicular workpiece surface will reduce the power density over the mirror 11 and the transducer 12 can detect this reduction to assist in positioning a workpiece perpendicular to the beam. If, for example, the beam is being used as a weld monitor, a peak signal may indicate a poor quality weld while the absence of such a signal indicates a good quality weld.

The workpiece 20 may alternatively be positioned upstream of the mirror, the beam striking the mirror having been either reflected from or at least partially transmitted through the workpiece.

Beam profile data can be obtained by incorporating a chopper which allows only sections of the beam to fall on the mirror 11 at any time. In addition, a fixed or variable aperture may block the beam prior to the mirror to allow data on beam diameter or precise location of the beam center to be taken.

We claim:

1. The method of detecting a selected characteristic of a beam of electromagnetic radiation, comprising the steps of:
   (a) positioning a mirror means for interception and redirection of a high power beam of radiation;
   (b) impinging a beam of high power radiation on said mirror means; and,
   (c) monitoring with acoustically coupled detection means stress waves induced in said mirror means by a high frequency signal incident in the beam.

2. A method according to claim 1 in which the incident beam is a direct beam from a source of the radiation.

3. A method according to claim 1 in which the indicent beam is a beam reflected from, or transmitted through, a workpiece disposed in the path of the beam, the workpiece being located upstream of the mirror means.

4. A method according to claim 1 in which the incident beam is a back reflected beam from a workpiece disposed in the path of the beam downstream of the mirror means.

5. The method of claim 1, including the step of:
   (a) detecting a frequency peak in the monitored signal.

6. Apparatus for the detection of a selected characteristic of a beam of electromagnetic radiation, comprising:
   (a) a highly reflecting mirror means;
   (b) means mounting said mirror means for interception and redirection of a high power beam of radiation;
   (c) transducer means acoustically coupled with said mirror means for detecting stress waves induced in said mirror means by a high frequency signal in the incident beam.

7. Apparatus according to claim 6 in which the transducer is a pressure sensitive transducer.

8. Apparatus according to claim 7 in which said pressure sensitive transducer comprises a piezoelectric crystal.

9. Apparatus according to claim 6 in which said transducer means is located against a surface of said mirror means.

10. Apparatus according to claim 9 in which means resiliently urge said transducer means against a surface of said mirror means.

11. Apparatus according to claim 6 in which the beam is a laser beam and said mirror means is located within the laser cavity.

12. Apparatus according to claim 6 further comprising a plurality of said transducer means so arranged that the combined output of said transducer means provides an indication of the beam size and/or position.

13. Apparatus according to claim 6 further comprising means for detecting the voltage level and/or frequency of the output signal from said transducer means.

14. The apparatus of claim 6, wherein:
   (a) said mirror means having a back surface;
   (b) a recess being disposed within said back surface;
   (c) said mounting means cooperating with said recess for therewith forming a chamber;
   (d) said transducer means being positioned within said chamber; and,
   (e) means communicating with said chamber for supplying to and removing from said chamber a coolant fluid.

15. The apparatus of claim 14, wherein:

(a) means being positioned within said chamber for resiliently urging said transducer means against said mirror means.

16. The apparatus of claim 14, wherein:
(a) signal transmitting means being in operative connection with said transducer means and including a portion extending from said chamber; and,
(b) recording means being operably associated with said signal transmitting means portion.

17. The apparatus of claim 16, wherein:
(a) said portion including a preamplifier and a signal processor in operative connection therewith; and,
(b) said recording means being in operative connection with said signal processor.

18. The apparatus of claim 15, wherein:
(a) means being disposed between said mirror means and said mounting means and around said resilient means for sealing said chamber.

19. The apparatus of claim 6, wherein:
(a) vacuum grease acoustically coupling said transducer means with said mirror means.

20. Apparatus for detection of a selected characteristic of a beam of electromagnetic radiation, comprising:
(a) a mirror assembly having a front surface and a back surface;
(b) a highly reflective coating on said front surface for reflecting a high power beam of radiation;
(c) a recess in said back surface;
(d) means operably associated for interception and redirection of a high power beam of radiation and for forming with said recess a cooling chamber;
(e) transducer means positioned within said chamber and acoustically coupled with said mirror assembly for detecting stress waves induced in said mirror assembly by a high frequency signal in the incident beam; and,
(f) means for supplying and for removing a coolant fluid from said chamber.

21. The apparatus of claim 20, wherein:
(a) said transducer means including a pressure sensitive transducer.

22. The apparatus of claim 21, wherein:
(a) said transducer comprising a piezoelectric crystal.

23. The apparatus of claim 20, wherein:
(a) means resiliently urging said transducer means against said mirror assembly.

24. The apparatus of claim 20, wherein:
(a) means being positioned between said back surface and said mounting means and around said recess for sealing said chamber.

25. The apparatus of claim 20, further comprising:
(a) signal recording means being in operative connection with said transducer means for recording the detected signal.

* * * * *